(12) United States Patent
Barcin et al.

(10) Patent No.: US 8,075,179 B2
(45) Date of Patent: Dec. 13, 2011

(54) PROCEDURE FOR A REASONABILITY CHECK OF A TEMPERATURE SENSOR

(75) Inventors: Buelent Barcin, Stuttgart (DE); Marc Chaineux, Stuttgart (DE); Andreas Wagner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 12/431,449

(22) Filed: Apr. 28, 2009

(65) Prior Publication Data

US 2009/0288734 A1    Nov. 26, 2009

(30) Foreign Application Priority Data

May 21, 2008 (DE) .................. 10 2008 001 919

(51) Int. Cl.
*G01K 15/00* (2006.01)
*G01K 13/00* (2006.01)
*F01N 11/00* (2006.01)

(52) U.S. Cl. ............................ 374/1; 374/141; 374/144

(58) Field of Classification Search .................. 374/1, 4, 374/5, 16, 54, 57, 141–145
See application file for complete search history.

(56) References Cited

U.S. PATENT DOCUMENTS

| 5,719,332 | A  | * | 2/1998  | Wallrafen ..................... 73/295 |
| 6,907,780 | B1 | * | 6/2005  | Meagher ....................... 73/299 |
| 7,004,625 | B2 | * | 2/2006  | Egidio ......................... 374/166 |
| 7,771,113 | B2 | * | 8/2010  | Corbet et al. .................... 374/1 |
| 2005/0251318 | A1 | * | 11/2005 | Wickert et al. ............... 701/108 |
| 2007/0006639 | A1 | * | 1/2007  | Sasanuma et al. ........... 73/53.01 |
| 2010/0319651 | A1 | * | 12/2010 | Kasahara .................. 123/198 R |
| 2011/0107812 | A1 | * | 5/2011  | Kasahara ...................... 73/1.02 |

FOREIGN PATENT DOCUMENTS

DE    10 2004 021 372    11/2005

* cited by examiner

*Primary Examiner* — Amy Cohen Johnson
(74) *Attorney, Agent, or Firm* — Merchant & Gould P.C.

(57) ABSTRACT

A procedure for a reasonability check of the signal of a temperature sensor that is arranged in a reducing tank, in particular a HWL-tank, is thereby characterized, in that the tank level is detected by a tank level sensor that is arranged almost at the same filling level position as the temperature sensor, in that the tank level sensor signal is compared to the temperature sensor signal and then, if default tank level sensor signals correlate within default limits with default temperature sensor signal values, a functioning temperature sensor and/or a functioning tank level sensor are indicated.

8 Claims, 3 Drawing Sheets

US 8,075,179 B2

PROCEDURE FOR A REASONABILITY CHECK OF A TEMPERATURE SENSOR

TECHNICAL FIELD

The invention concerns a procedure for a reasonability check of the signal of a temperature sensor that is arranged in a reducing agent tank, in particular a HWL tank.

Subject matter of the invention are also a computer program as well as a computer program product with a program code, which is stored on a machine readable medium, for implementing the procedure.

BACKGROUND

The exhaust gases of combustion engines, which are operated with an air ratio of lambda=1, also Otto combustion engines are effectively purified with the aid of so-called three-way catalytic converters. Thereby in particular nitrous gases, hydrocarbons and carbon monoxide are removed from the exhaust gas. The exhaust gases of combustion engines, which work with an air ratio of lambda >1, thus for example Diesel combustion engines or Otto combustion engines in lean operation, can be purified only partially with such catalyzers. Hereby only the hydrocarbons and the carbon monoxide are mostly degraded, while nitrous gases cannot be noticeably reduced due to the high oxygen content in the exhaust gas.

To enable also a purification of nitrous gases in exhaust gases of such combustion engines the so-called selective catalytic reduction is known (SCR-procedure). Hereby ammoniac is often used as the reducing agent, which is created at the SCR-procedure by a urea-hydrolysis. The urea that is carried along in a watery solution serves as ammoniac carrier and is converted to ammoniac with the aid of a metering system by hydrolysis-catalyzer, which then reduces nitrous gases in the SCR-catalyzer. The watery urea-solution, subsequently called "reducing agent", is stored in a tank, subsequently also termed as HWL tank.

A procedure and a device for metering a corresponding reagent or reducing agent for purifying the exhaust gas of combustion engines is for example known from DE 10 2004 021 372 A1.

The watery urea-water solution, which is stored in the HWL-tank, freezes there at a temperature of −11° C. In that case the system start and therefore the NOx-reduction is delayed depending on the exact tank temperature according to the maximum melting time that is set by the environmental authorities in order to melt a minimum amount HWL in this time. In order to determine the temperature in the HWL tank, a temperature sensor is built into the HWL tank. This tank temperature sensor has to be controlled as exhaust gas relevant component according to the regulations of the On-Board diagnosis II (OBD II). The OBD II requires that exhaust gas relevant components fulfill the following requirements:

SCR-signal range check: continuous electric control of exhaust gas relevant components;
rationality faults: function for a reasonability check, in order to detect, whether the sensor value is moving in a reasonable range and whether it provides a reasonable behavior;
manipulation detection: a simple manipulation of the exhaust gas relevant components has to be detectable.

In order to realize this function at a temperature sensor, which is built into a HWL tank, which means in order to undertake a reliable reasonability check of a temperature sensor, a second temperature sensor has to be provided for example, with whose aid the first temperature sensor is checked. But the construction of a second temperature sensor is very costly.

The task of the invention is therefore to provide a procedure for a reasonability check of the signal of a temperature sensor that is arranged in a HWL tank, which works without a second temperature sensor and can therefore be technically simply and affordably realized.

SUMMARY

This task is solved by a procedure with the characteristics of claim 1.

The basic idea of the invention is to use the tank level sensor, which is used until now only for determining the tank filling level, for controlling the tank temperature sensor.

The use of the tank level sensor for the reasonability check of the tank temperature sensor signal requires no additional hardware, as for example no further redundant temperature sensor and no additional circuit and so on. The tank filling level is detected by a—anyway present—tank level sensor, which is arranged in the same filling level position as the temperature sensor, the tank level sensor signal is compared to the temperature sensor signal and then, when default tank level sensor signal values correlate with default temperature sensor signal values within default limits, this indicates a functioning temperature sensor and/or a functioning tank level sensor. Within default limits means thereby for example in the case of the temperature sensor within default temperature limits, in the case of the tank level sensor means within default filling level limits. Correlating has the wide meaning "matching" or "compatible" or "plausibly referring to each other". The great advantage of this procedure is that a reciprocal reasonability check of the sensor signals is enabled with the aid of the two sensors that are arranged in the tank.

With the measures that are stated in the dependent claims enable advantageous improvements and embodiments of the procedure that is stated in the independent claims.

Thus an advantageous embodiment of the procedure provides in case of a correspondence of the tank temperature sensor values with the temperature values below the freezing point of the reducing agent, that a functioning tank temperature sensor and/or also a functioning tank level sensor are indicated, if the tank level sensor detects the absence of fluid. If the temperature values lie below the freezing point of the reducing agent and the temperature sensor detects a value below the freezing point of the reducing agent, the tank level sensor cannot detect any fluid, because it is frozen. A proper functioning tank level sensor provides in that case no filling level signal. As a result a functioning tank level sensor and a functioning tank temperature sensor have to be assumed.

If the tank temperature sensor emits values, which correspond with the temperature values, which lie above the freezing point of the reducing agent, a reasonability check of the temperature sensor takes thereby place that the sensor signals of the temperature sensor and the tank level sensor are compared to each other. This takes place in that case thereby that it is checked, whether the tank level sensor emits values, which indicate the presence of fluid. If that is the case, it can be assumed that the tank temperature sensor as well as the tank level sensor are functioning properly; by all means a failure of one of the two sensors cannot be detected.

But if the tank level signal values do not correlate with the tank temperature signal values within the default limits, thus if no filling level is detected, even though the measured temperature of the reducing agent lies above the freezing point of the reducing agent, it is provided to built up a pressure in the tank system by activating a pump and depending on whether a pressure built-up is possible or not, statements about the functioning of the tank temperature sensor and/or the tank level sensor can be made. Thus it is for example advantageously provided that, when a reasonability check of the signal values that has been emitted by the tank level sensor and the signal values that have been emitted by the temperature sensor is not possible, it has to be tried to built up a pressure in the pressure line system of such a basically familiar metering device. If in that case one the of the sensors provides a signal, which indicates the presence of fluid in the tank, for example if the temperature sensor provides a signal for a temperature bigger than the freezing temperature of the reducing agent or if the tank level sensor provides a signal for a fluid level and the other sensor provides a signal, which indicates that no fluid is present in the tank, for example if the tank level sensor provides a signal, which indicates an empty tank or if the temperature sensor provides a signal, which indicates a temperature below the freezing point, thus the presence of frozen reducing agent, then an eventually present error can be detected this way and located with the aid of trying to built-up pressure.

If a pressure built-up is possible, which is only the case when the pump can deliver reducing agent, thus when the reducing agent is present in a fluid form, it can be assumed that the sensor, which detects the absence of fluid, is defect. But if a pressure built-up is not possible, for example because the tank is empty or because the reducing agent is frozen, it can be assumed that the sensor, which detects fluid, is defect. Therefore a process of elimination can be quasi realized in so far.

A further embodiment of the procedure provides an offset-test. In that case it is provided that, if the temperature sensor value corresponds with a value, which lies below the freezing point of the reducing agent, the fluid in the HWL-tank is heated and the temperature sensor value is compared to the tank level sensor value during the heating process and at the point of time, at which the tank level sensor value corresponds with a value, which characterized the presence of fluid reducing agent, the temperature sensor value is compared with the temperature value that characterizes the freezing point of the reducing agent and at discord a balancing, thus a calibrating of the temperature sensor value is undertaken. This balancing can for example be carried out by an offset-creation.

BRIEF DESCRIPTION OF THE DRAWINGS

Embodiments and configurations of the invention are further explained in the context of the drawing and the following description.

The drawings show.

DETAILED DESCRIPTION

Figure 1:
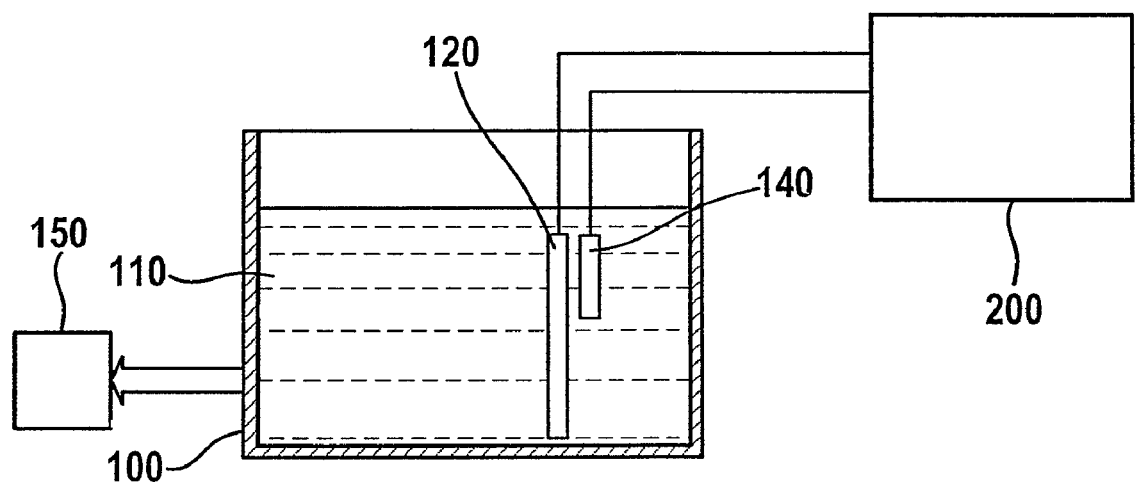
FIG. 1 shows schematically a HWL-tank system, which uses the procedure according to the invention.

One example of a reducing agent tank system, for example a HWL-tank system is schematically shown in FIG. 1. A tank 100 is filled with a reducing agent, for example a urea-water solution 110. The tank 100 is fluidly connected with a pump 150, which conveys the reducing agent by a familiar way into a pressure line system, which leads to a metering valve (not shown). A tank level sensor 120 and a tank temperature sensor 140 are at approximately the same filling level in the tank 100, which means they are arranged at the same filling level height. The signals of these two sensors are provided to a control unit 200, in which the steps of the procedure that are subsequently described are carried out. The procedure can be implemented as computer program in the control unit 200. The source code can be saved on a computer program product, which the control unit 200 can read. That way also an upgrade of already existing tank systems, which provide a tank temperature sensor 140 and a tank filling or tank level sensor 120, is enabled.

Figure 2:
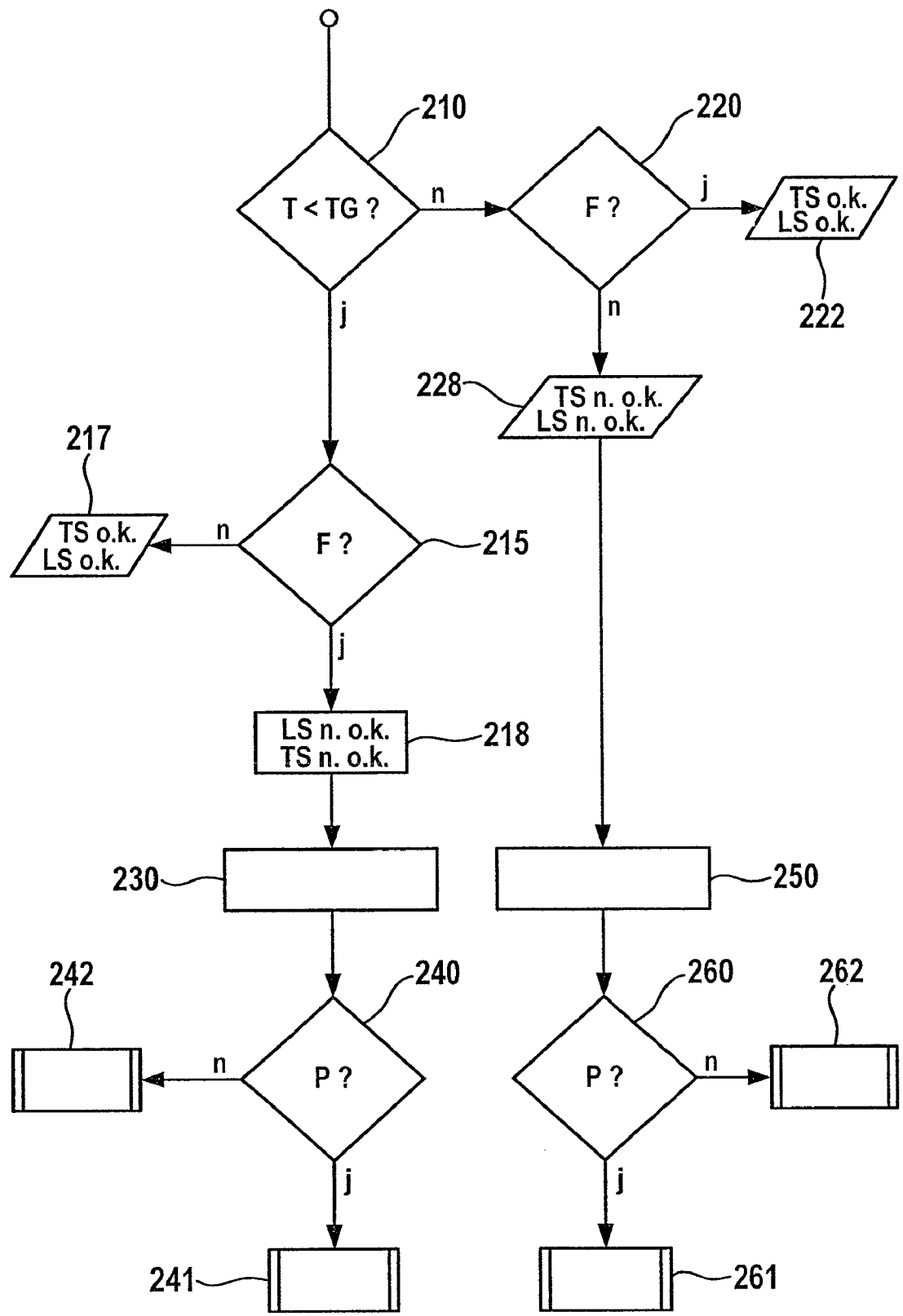
FIG. 2 is a flow chart of the steps of the procedure according to the invention and FIG. 3 is a flow chart of an embodiment of the procedure according to the invention for calibrating the temperature sensor.

A procedure according to the invention is subsequently described in connection with FIG. 2. It is checked in a first step 210, thus for example with the aid of the tank temperature sensor 140, whether the temperature value that has been detected by the temperature sensor 140 is lower than the freezing temperature TG. Simultaneously the filling level is detected with the aid of the tank level sensor 120. If the filling level is not in a fluid phase, which is checked in step 215, in which F? means the checking of the presence of the fluid phase, it can be assumed, that both sensors are working properly (step 217, TS o. k., LS o. k.). But if the filling level lies within default limits, which means if the reducing agent is in a fluid phase, TS or the filling level sensor LS do not function properly ("LS n.o.k.?" "TS n.o.k.?"). That is therefore that because the temperature of the reducing agent cannot be lower than the freezing point when fluid reducing agent is in the tank. But principally it can also be the case that the filling level sensor LS does not function properly, thus that in reality there is no fluid reducing agent present. In order to determine which one of the two sensors does not work properly, a pressure built-up is carried out in step 230. After all also the functioning of the two sensors, which has been determined in step 217, can be verified by a pressure built-up.

Pressure built-up means thereby that the pump 150 delivers the reducing agent by a familiar way over a pressure line system to a metering vale (not shown). A pressure built-up is therefore equivalent to the ability to deliver fluid through the pump 150. This is checked in step 240, in which P? means the checking, whether a pressure built-up is possible. It that is the case, it can be assumed that the sensor, which detects the absence of fluid, is defect. If for example in that case the tank filling level sensor 120 detects a filling level and the temperature sensor 140 detect a value, which lies below the freezing temperature, it has to be assumed that the temperature sensor 140 is defect. If on the other hand the temperature sensor 140 detects a value, which is higher than the freezing temperature and the filling level sensor 140 detects no filling level, it has to be assumed that the filling level sensor is defect. This is determined in the subprogram 241 and if necessary a corresponding error message is emitted.

But if no pressure built-up is possible, thus if no fluid reducing agent is in the tank 100, the sensor, which detects the presence of fluid reducing agent, has to be defect. If according to this no pressure built-up is possible and the temperature sensor 140 detects a value, which lies below the freezing temperature, but the filling level sensor 120 emits a value, which characterizes the presence of fluid reducing agent, a defect filling level sensor 120 has to be assumed. If the other way around the filling level sensor 120 detects a value, which indicates the absence of fluid and the temperature sensor 140 detects a value, which is higher than the freezing temperature, a defect of the temperature sensor 140 has to be assumed. This is determined in a subprogram 242 and if necessary a corresponding error message is emitted.

By the pressure built-up a selection process is quasi enabled, which allows a limitation of the source of error.

But if the temperature T is higher than the freezing temperature TG, thus the inquiry in step 210 has to be answered with no, it is again checked (step 220), whether fluid reducing agent is present. If that is the case and the filling level sensor 120 detects a fluid level, and if the temperature that has been measured by the temperature sensor 140 corresponds within default limits with a value, which is higher than the freezing temperature TG of the reducing agent, it is assumed in step 222 that the tank temperature sensor 140 and the filling level sensor 120 are functioning properly. This in particular if the previously described steps of the procedure 220, 222 are carried out after the reducing agent has been melted in the tank by heating.

But if the inquiry in step 220 is answered with no, thus if no fluid reducing agent is detected, even though the temperature is higher than the freezing temperature TG of the reducing agent, an output has to occur in step 228, that the temperature sensor 140 does not function properly and/or that the tank level sensor 120 does not function properly. In that case on the other hand a pressure built-up occurs (step 250) and it is checked in step 260, whether a pressure built-up is possible. If a pressure built-up is possible the sensor, which detects the absence of fluid, has to be defect, for example the filling level sensor 120, in so far as it does not detect a filling level or the temperature sensor 140, because it emits a temperature, which lies below the freezing temperature. This is determined in a subprogram 261 and if necessary a corresponding error message is emitted. But if a pressure built-up is not possible, it can be assumed that the temperature sensor 140, which detects a temperature below the freezing temperature, functions properly, while the filling level sensor 120, which detects the absence of fluid, does not function properly. This is determined in a subprogram 262 and if necessary a corresponding error message is emitted. Thus also in that case a limitation of the error, thus a detection of the defect sensor is possible by this selection procedure, whereby it also has to be noted here that even the properly functioning of the sensors (step 222) can be verified correspondingly.

Figure 3:
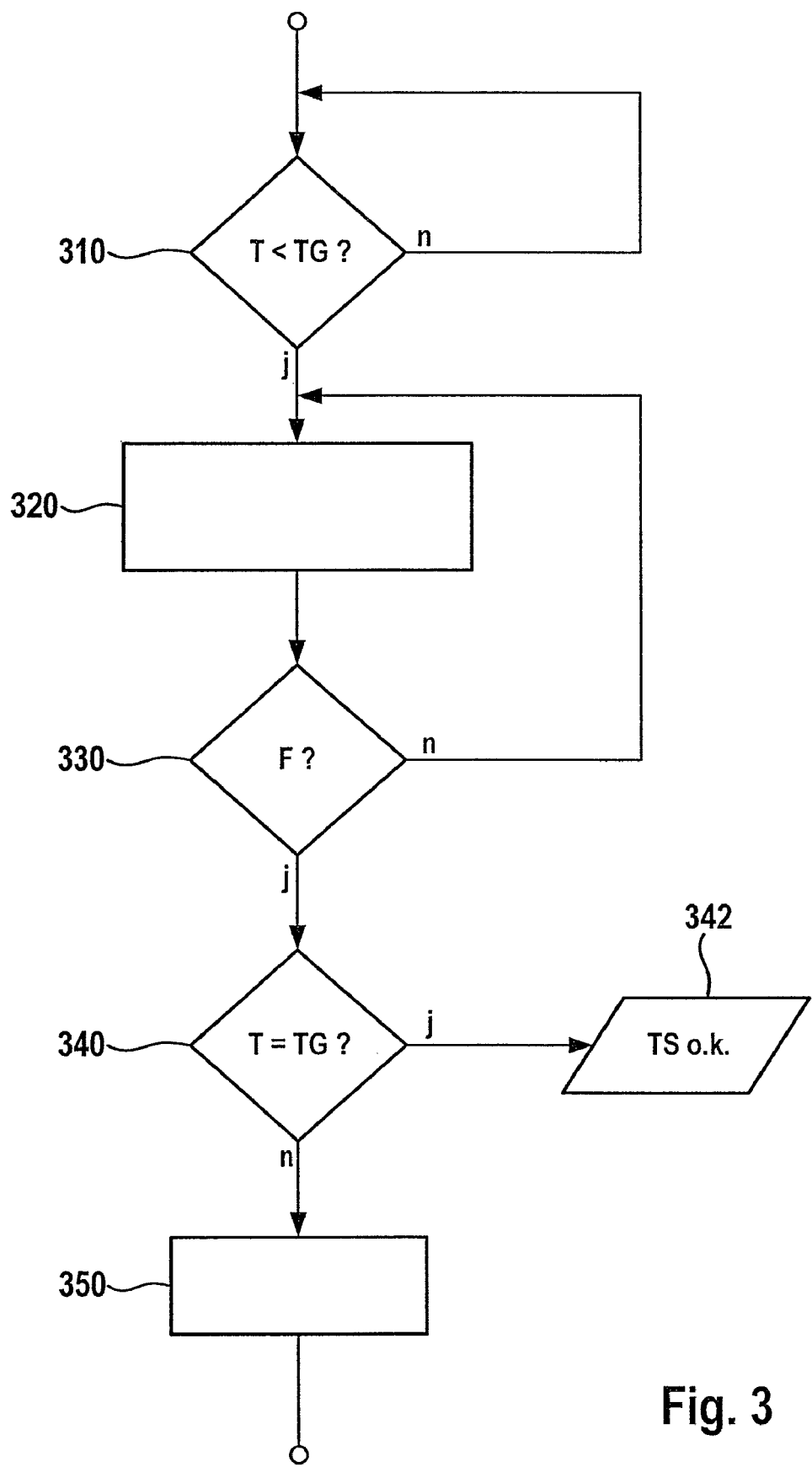

A further embodiment of the procedure allows an offset-determination and therefore a calibrating of the temperature sensor 140. This procedure is subsequently explained in connection with FIG. 3. At first it is checked in step 310, whether the temperature of the reducing agent is lower than the freezing temperature T<TG. If that is not the case, thus if the reducing agent is frozen, the reducing agent is heated in the tank in step 320 and with the aid of the tank level sensor 120 it is checked in step 330, whether fluid reducing agent is present. Therefore it is always jumped back before step 320 if that is not the case and the reducing agent is further heated. But as soon as the reducing agent is fluid, it is checked with the aid of the temperature sensor 140 in step 340, whether the measured temperature T corresponds with the freezing temperature TG. If that is the case it is emitted in step 342 that the temperature sensor 140 is functioning properly. If that is not the case a balancing in terms of a calibration of the temperature sensor 140 takes place in step 350 for example by an offset-creation.

The previously described procedure can—as already mentioned—be carried out as computer program and be implemented in the control unit 200. It can be stored on a computer program product and in so far also be upgraded at existing systems.

The invention claimed is:

1. A method of performing a reasonability check of a signal of a tank temperature sensor that is arranged in a reducing tank, the method comprising:
detecting a tank level by a tank level sensor that is arranged almost at a same filling level position as the tank temperature sensor, wherein a tank level sensor signal is compared to a tank temperature sensor signal, and wherein a functioning tank temperature sensor and tank level sensor are indicated if default tank level sensor signal values correlate within default limits with default tank temperature sensor signal values.

2. The method according to claim 1, further comprising:
upon detecting tank temperature sensor values corresponding with temperature values below a freezing point of a reducing agent and the tank level sensor detecting an absence of fluid,
indicating that the tank temperature sensor and the tank level sensor are functioning.

3. The method according to claim 1, further comprising:
upon detecting tank temperature sensor values corresponding with values that are above a freezing point of a reducing agent and tank level sensor values corresponding with values that characterize a presence of fluid,
indicating that the tank temperature sensor and the tank level sensor are functioning.

4. The method according to claim 1, further comprising:
upon detecting tank level sensor signal values not correlating within the default limits with the tank temperature sensor signal values,
building up a pressure in the reducing tank system, wherein when a pressure build-up is possible the sensor that detects an absence of fluid reducing agent is detected as defective, and wherein if pressure build-up is not possible the sensor that detects a presence of fluid reducing agent is detected as defective.

5. The method according to claim 1, further comprising:
upon detecting tank temperature sensor values corresponding with a value that is below a freezing point of a reducing agent,
continually comparing the tank temperature sensor value to the tank level sensor value during a simultaneous heating of the tank, wherein at a point of time at which the tank level sensor value corresponds with a value that characterizes a presence of fluid reducing agent, the tank temperature sensor value is balanced out with the temperature value that characterizes the freezing point of the reducing agent at a non-compliance.

6. The method according to claim 5, further comprising undertaking the balancing by an offset creation.

7. A computer program that executes all steps of a method, if run on a control unit of a combustion engine, of performing a reasonability check of a signal of a tank temperature sensor that is arranged in a reducing tank, the method comprising: detecting a tank level by a tank level sensor that is arranged almost at a same filling level position as the tank temperature sensor, wherein a tank level sensor signal is compared to a tank temperature sensor signal, and wherein a functioning tank temperature sensor and tank level sensor are indicated if default tank level sensor signal values correlate within default limits with default tank temperature sensor signal values.

8. A computer program product with a program code that is stored on a machine readable medium to implement, if the program is carried out on a control unit, a method of performing a reasonability check of a signal of a tank temperature sensor that is arranged in a reducing tank, the method comprising: detecting a tank level by a tank level sensor that is arranged almost at a same filling level position as the tank temperature sensor, wherein a tank level sensor signal is compared to a tank temperature sensor signal, and wherein a functioning tank temperature sensor and tank level sensor are indicated if default tank level sensor signal values correlate within default limits with default tank temperature sensor signal values.

* * * * *